United States Patent
Uchida et al.

(10) Patent No.: US 7,143,209 B2
(45) Date of Patent: Nov. 28, 2006

(54) STORAGE CONTROL APPARATUS AND CONTROL METHOD THEREOF

(75) Inventors: Koji Uchida, Kawasaki (JP); Takaaki Saito, Kawasaki (JP); Mikio Ito, Kawasaki (JP); Kazuma Takatsu, Kawasaki (JP); Hidejirou Daikokuya, Kawasaki (JP); Akihito Kobayashi, Kawasaki (JP); Kazuhiko Ikeuchi, Kawasaki (JP); Sanae Kamakura, Kawasaki (JP); Shinichi Nishizono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 347 days.

(21) Appl. No.: 10/767,426

(22) Filed: Jan. 29, 2004

(65) Prior Publication Data

US 2004/0186924 A1    Sep. 23, 2004

(30) Foreign Application Priority Data

Feb. 28, 2003   (JP)   ............................... 2003-52517

(51) Int. Cl.
*G06F 3/00*   (2006.01)
(52) U.S. Cl. ............................................ 710/36; 710/5
(58) Field of Classification Search .................... 710/5, 710/8, 10, 14–17, 33, 36; 711/100, 112, 711/113–114

See application file for complete search history.

(56) References Cited

U.S. PATENT DOCUMENTS

| | | | | |
|---|---|---|---|---|
| 5,423,046 A | * | 6/1995 | Nunnelley et al. | 713/330 |
| 6,009,481 A | * | 12/1999 | Mayer | 710/33 |
| 6,948,010 B1 | * | 9/2005 | Somers et al. | 710/23 |
| 2003/0182503 A1 | * | 9/2003 | Leong et al. | 711/114 |

FOREIGN PATENT DOCUMENTS

| | | |
|---|---|---|
| JP | 61-136123 | 6/1986 |
| JP | 6-004451 | 1/1994 |
| WO | WO99/59064 | 11/1999 |

* cited by examiner

*Primary Examiner*—Fritz Fleming
*Assistant Examiner*—David E. Martinez
(74) *Attorney, Agent, or Firm*—Greer, Burns & Crain, Ltd (57) ABSTRACT

A storage control apparatus concatenates a plurality of logical units to construct a large capacity logical unit, wherein logical units extending over a plurality of controllers can be concatenated. The channel adapter sends an I/O request to one controller which charges one logical unit constituting the concatenation logical unit, out of a plurality of controllers when an I/O request is sent from a host to the concatenation logical unit LU linking a plurality of logical units, executes I/O processing in the one controller, then sends the I/O request to another controller which charges another logical unit constituting the concatenation logical unit, and continues I/O processing in the another controller.

14 Claims, 11 Drawing Sheets

| HOST LU NUMBER | CONCATENATION LU NUMBER | START LBA | END LBA | LU NUMBER | CM NUMBER |
|---|---|---|---|---|---|
| 0 | 0 | 00000000 | 00000FFF | 0 | 0 |
|   |   | 00001000 | 00001FFF | 1 | 1 |
|   |   | 00002000 | 00003FFF | 2 | 0 |
|   |   | 00004000 | 00007FFF | 3 | 1 |
| 1 | 1 | 00000000 | 00000FFF | 4 | 1 |
|   |   | 00001000 | 00004FFF | 5 | 1 |
| 2 | 2 | : | : | : | : |
|   |   | : | : | : | : |
|   |   | : | : | : | : |

| CONCATENATION LU NUMBER | START LBA | END LBA | LU NUMBER | CM NUMBER |
|---|---|---|---|---|
| 0 | 00000000 | 00000FFF | 0 | 0 |
|   | 00001000 | 00001FFF | 1 | 1 |
|   | 00002000 | 00003FFF | 2 | 0 |
|   | 00004000 | 00007FFF | 3 | 1 |
| 1 | 00000000 | 00000FFF | 4 | 1 |
|   | 00001000 | 00004FFF | 5 | 1 |
| 2 | : | : | : | : |
|   | : | : | : | : |
|   | : | : | : | : |

STORAGE CONTROL APPARATUS AND CONTROL METHOD THEREOF

CROSS-REFERENCE TO RELATED APPLICATIONS

This application is based upon and claims the benefit of priority from the prior Japanese Patent Application No. 2003-052517, filed on Feb. 28, 2003, the entire contents of which are incorporated herein by reference.

BACKGROUND OF THE INVENTION

1. Field of the Invention

The present invention relates to a storage control apparatus and a method thereof for actually accessing a physical storage device constituting a logical unit according to the access request from the host in the units of the logical unit, and more particularly to a storage control apparatus which constitutes a large logical unit by concatenating a plurality of logical units, and a method thereof.

2. Description of the Related Art

In a storage device using such a storage medium as a magnetic disk, magneto-optical disk and optical disk, the storage medium is actually accessed by the request of the data processor. If the data processor uses large capacity data, a storage system comprising a plurality of storage devices and a control apparatus for controlling the storage devices is used.

Figure 12:
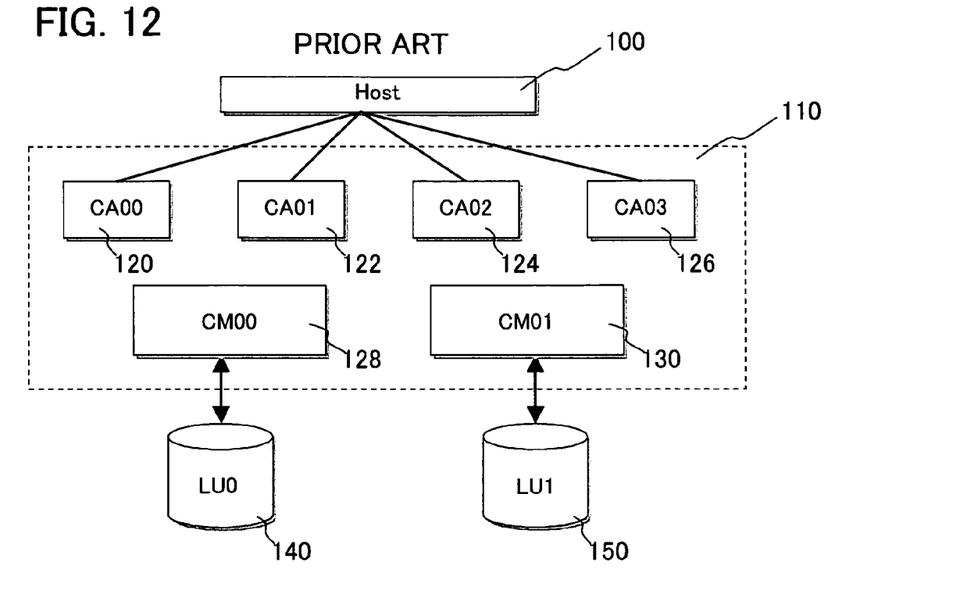
FIG. 12 is a block diagram depicting a prior art storage system.
Figure 13:
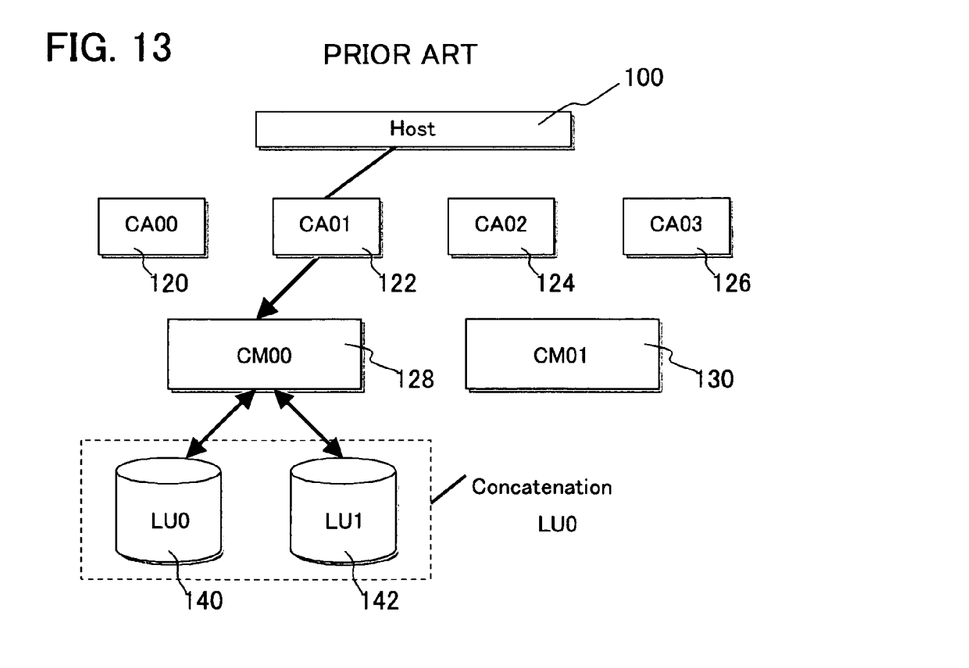
FIG. 13 is a diagram depicting a concatenation LU of the prior art.

In such a storage system, the host recognizes the physical disk unit in the units of the logical unit (or logical volume). Depending on the capability of the control apparatus, the capacity of the logical unit is limited. FIG. 12 shows a block diagram of a prior art storage system, and FIG. 13 is a diagram depicting the concatenation of conventional logical units.

As FIG. 12 shows, the host 100 is connected to the control apparatus 110. The control apparatus 110 is comprised of a plurality (4 in this case) of CAs (Channel Adapters) 120, 122, 124 and 126, and a plurality (2 in this case) of CMs (Centralized Modules) 128 and 130.

The CAs 120, 122, 124 and 126 are connection modules with the host 100, and the CM 128, 130 includes a cache memory and controls the disk. The CM 128, 130 controls the logical unit 140, 150. The logical unit 140, 150 is comprised of a single or a plurality of physical disk devices which constitutes the logical volume.

For the connection format of the CM 128, 130 and the logical unit 140, 150, the maximum number of logical units (number of physical disks) that can be connected to one CM is limited, considering the load distribution specified depending on the capability of the controller of the CM 128, 130 and the size of the cache memory, and one logical unit is not connected to a plurality of CMs.

In other words, in order to improve the response of host access, a cache memory is disposed in the CM 128, 130, and stores a part of the data of the disk device which the respective CM charges, and the write data from the host.

In other words, when read access is received from the host, the data of the cache memory is read and transferred without actually accessing the disk apparatus if the target data is staged in the cache memory. When write access is received from the host, the write data is written to the cache memory, and the writing is completed. The write data in the cache memory is written back to the target disk device during processing idle time.

If the cache memory is installed to improve host access in this way, the load must be distributed with limiting the number of logical units to be connected to one CM, since the size of the cache memory is limited, and the capability of the controller is also limited.

However, some users have the demand to increase the capacity of the logical unit when viewed from the host side. Therefore conventionally a method for concatenating a plurality of logical units 140 and 142 to be connected to one CM 128, so that the host 100 recognizes them as one large logical unit LU0, has been provided, as shown in FIG. 13.

With this prior art, however, a plurality of logical units cannot be concatenating under one CM, so the load of the CM for controlling the concatenated large capacity logical unit increases, which may drop host access performance.

Also in the case of a system which has a plurality of CMs, the logical units to be concatenated must be under one CM, so the number of logical units to be concatenated is limited, and constructing a flexible large capacity logical unit is difficult.

SUMMARY OF THE INVENTION

With the foregoing in view, it is an object of the present invention to provide a storage control apparatus and a control method for preventing the increase of load of the controller, even if the logical units are concatenated.

It is another object of the present invention to provide a storage control apparatus and a control method for removing restrictions of the logical units to be concatenated, and constructing a flexible large capacity logical unit.

It is still another object of the present invention to provide a storage control apparatus and a control method thereof for preventing a drop in host access performance, even if the logical units are concatenated.

To achieve these objects, the storage control apparatus of the present invention is a storage control apparatus for accessing data of a logical unit, which is comprised of a single or a plurality of physical units, by a request from a host, having a channel adapter for interfacing with the host, and a plurality of controllers which charge each one of a plurality of logical units, wherein the channel adapter sends an I/O request to one controller which charges one logical unit constituting the concatenation logical unit concatenating the plurality of logical units, out of the plurality of controllers when the host sends an I/O request to the concatenation logical unit, performs the I/O processing in the one controller, then sends the I/O request to another controller which charges another logical unit constituting the concatenated logical unit, and executes the I/O processing in the other controller.

The storage control method of the present invention is a storage control method for accessing data of a logical unit, which is comprised of a single or a plurality of physical units, by a request from a host, having steps of: receiving an I/O request from the host to a concatenation logical unit concatenating a plurality of logical units using a channel adapter; sending the I/O request from the channel adapter to one controller which charges one logical unit constituting the concatenated logical unit out of a plurality of controllers which charges the plurality of logical units, and executing I/O processing in the one controller; and sending the I/O request from the channel adapter to another controller, which charges another logical unit constituting the concatenation logical unit, and executing the I/O processing in the other controller.

In the present invention, logical units extending over a plurality of controllers can be concatenated by data request processing to the plurality of controllers, so the load of I/O processing of a concatenation LU (Logical Unit) in the controllers can be distributed. In other words, the logical units can be concatenated without increasing the performance of the controller and the size of the cache memory. Also flexibility of selecting the logical units to be concatenated increases, a flexible large capacity LU can be constructed, and user convenience can be improved.

In the present invention, it is preferable that the one controller judges for the channel adapter whether the I/O request is an I/O request extending over to another controller, which charges another logical unit constituting the concatenation logical unit after the I/O processing, and responds the judgment result to the channel adapter.

In this aspect, the controller judges whether the I/O request extends over to another controller of another logical unit constituting the concatenation logical unit, so the load of the channel adapter can be decreased, and the I/O request can be accepted without allowing the host to wait.

In the present invention, it is preferable that each of the controllers has a table for storing the LBA range of each logical unit, and refers to this table in the LBA range requested by the I/O request and judges whether the I/O request is an I/O request extending over to another controller, which charges another logical unit constituting the concatenation logical unit, so whether the I/O request extends over to another controller can be easily judged by referring to a table.

Also in the present invention, it is preferable that the channel adapter sends the I/O request to the other controller according to the response that the I/O request extends from the one controller to the other controller, so the channel adapter can easily execute the I/O processing extending over controllers by a message response.

Also in the present invention, it is preferable that the channel adapter has a table for storing the controllers corresponding to each logical unit, the LBA range of each logical unit and the logical units constituting the concatenation logical unit, and selects the controller of the corresponding logical unit when an I/O request is received from the host. Therefore the channel adapter can easily select the controller of the logical unit corresponding to the I/O request from the host.

Also in the present invention, it is preferable that each controller further has a cache memory for storing a part of the data of the logical unit which each controller charges, and a processing section for executing I/O processing using the cache memory according to the I/O request. By this, even an I/O request which extends over the controllers can be I/O processed at high-speed.

Also in the present invention, it is preferable that the channel adapter has a plurality of channel adapters for connecting the plurality of controllers, therefore the concatenation LU access of a plurality of hosts becomes possible.

DESCRIPTION OF THE PREFERRED EMBODIMENTS

Embodiments of the present invention will now be described in the sequence of the storage system, I/O processing and other embodiments.

[Storage System]

Figure 1:
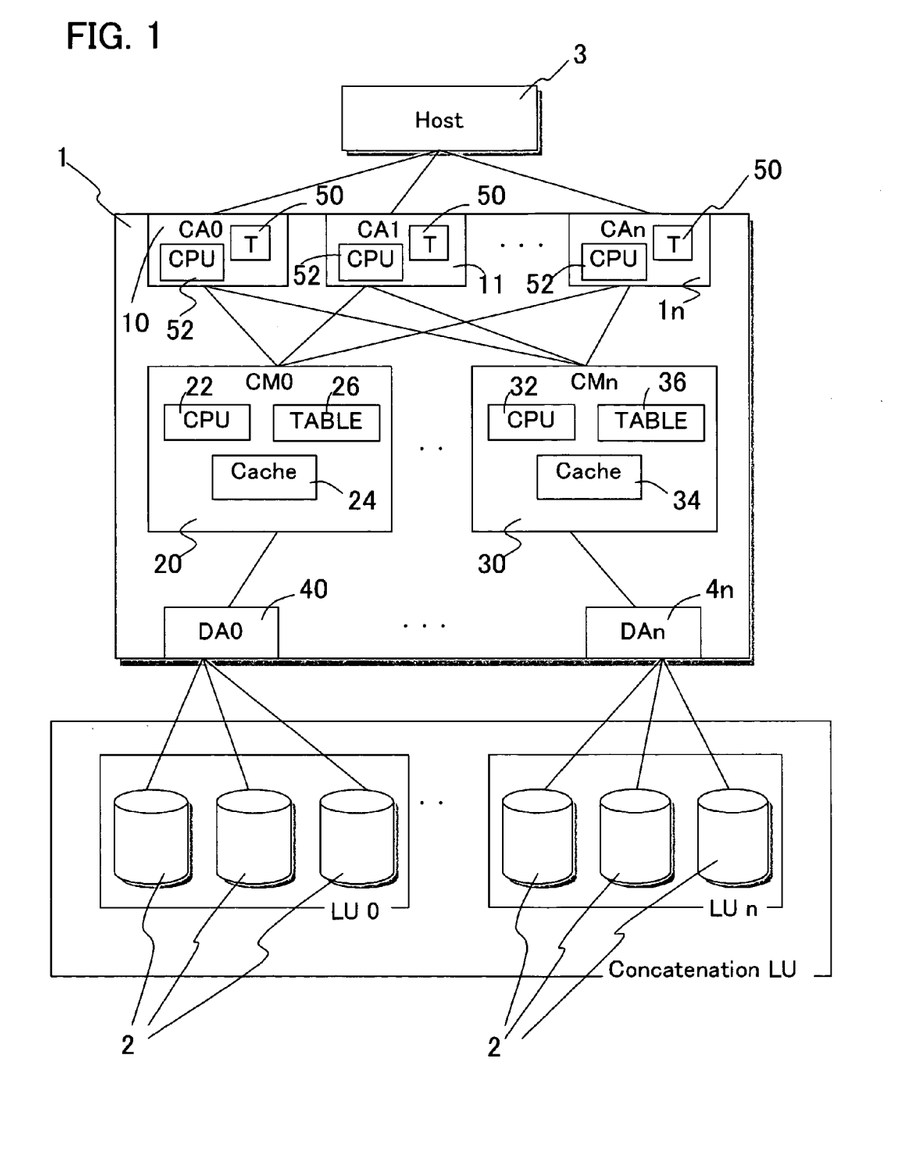
FIG. 1 is a block diagram depicting the storage system according to an embodiment of the present invention.
Figure 2:
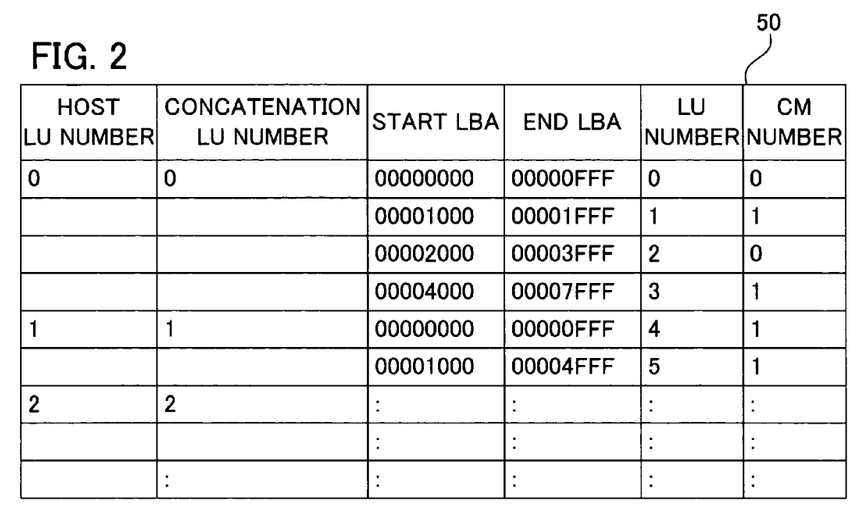
FIG. 2 is a diagram depicting the CA control table in FIG. 1.
Figure 3:
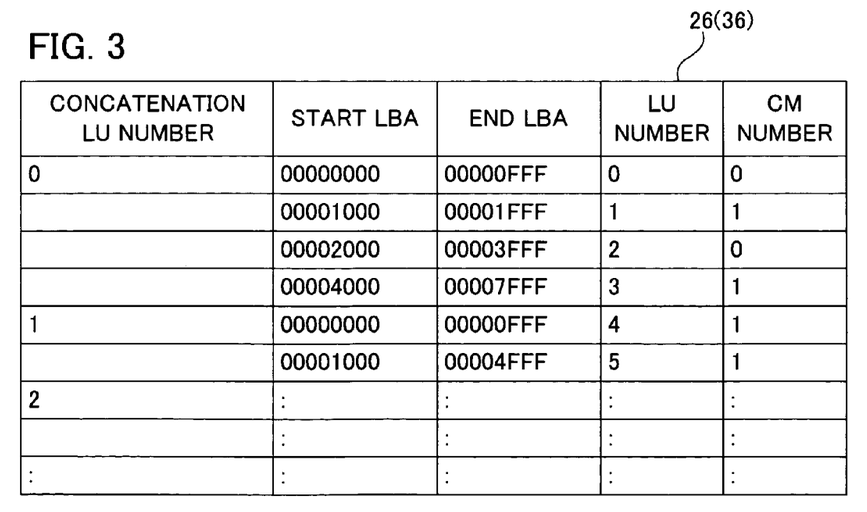
FIG. 3 is a diagram depicting the CM control table in FIG. 1.

FIG. 1 is a block diagram depicting a storage system according to an embodiment of the present invention, FIG. 2 is a diagram depicting a control table of the CA thereof, and FIG. 3 is a diagram depicting the control table of the CM thereof. FIG. 1 shows a RAID (Redundant Arrays of Inexpensive Disks) system using magnetic disks. As FIG. 1 shows, the storage system is comprised of a storage control apparatus (file control apparatus) 1 which is connected to the host 3, and many magnetic disk devices 2 which are connected to the storage control apparatus 1.

The storage control apparatus 1 is comprised of function modules of a plurality of CAs (Channel Adapters) 10, 11, . . . , 1n, a plurality of CMs (Centralized Modules) 20, 30, and a plurality of DAS (Device Adapters) 40, . . . 4n.

The CA (Channel Adapter) 10, 11, . . . or 1n is a circuit for controlling the host interface connecting the host 3, and is comprised of a fiber channel circuit (FC), CPU 52, and control table 50 (described later in FIG. 2). The DA (Device Adapter) 40, . . . or 4n is a circuit for exchanging commands and data with the disk device for controlling the disk device 2, and is comprised of a fiber channel circuit (FC) and DMA (Direct Access Memory) circuit, for example.

The CM (Centralized Module) 20, 30 is comprised of a CPU (Central Processor Unit) 22, 32, cache memory 24, 34 and control table 26, 36 (described later in FIG. 3). The CPU 22, 32 executes the file access program (read/write program) and the RAID management program to execute read/write processing and RAID management processing.

The CM 20 charges the disk apparatus 2 of the logical unit LU0, and the CM 30 charges the disk apparatus 2 of the logical unit LUn. In FIG. 1, in each logical unit LU0, LUn, the disk device 2 has the RAID 5 configuration, for example. The cache memory 24, 34 stores a part of the data of the disk device of which the respective cache memory 24, 34 charges, and stores the write data from the host.

The CPU 22 receives the read request from the host 3 via the CAs 10, 11, . . . , 1n, refers to the cache memory 24, judges whether access to the physical disk is necessary, and if necessary, requests the disk access request to the DA 40. The CPU 22 also receives the write request from the host 3, writes the write data to the cache memory 24, and requests a write back, which is scheduled internally, to the DA 40.

In the same way, in the CM 30 as well, the CPU 32 receives the read request from the host 3 via the CAs 10, 11, . . . , 1n, refers to the cache memory 34, judges whether access to the physical disk is necessary, and if necessary, requests the disk access request to the DA 4n. The CPU 32 also receives the write request from the host 3, writes the write data to the cache memory 34, and requests a write back, which is scheduled internally, to the DA 4n.

In the CAs 10, 11, . . . , 1n, the control table 50, shown in FIG. 2, is disposed respectively. In FIG. 2, the Host LU Number is a host logical unit number which the host 3 recognizes, the Concatenation LU Number is a concatenation logical unit number, the LU Number is a logical unit number, the CM Number is a CM model number which charges the logical unit, the Start LBA is a start LBA (Logical Block Address) of the logical unit with the logical unit number, and the End LBA is an end LBA (Logical Block Address) of the logical unit with the logical unit number.

In other words, the control table 50 of the CA 10 stores the logical unit number which the host 3 recognizes, the corresponding logical unit number which the storage system recognizes, the CM model number which charges this logical unit, the concatenation logical unit number which is defined for the logical units of one host, and the stored space (start and end logical block addresses) of each logical unit of the storage system.

In the CM 20 (30), the control table 26 (36) shown in FIG. 3 is disposed. The control table 26 (36) stores the logical unit number (LU Number) which the storage system recognizes, the CM model number (CM Number) which charges this logical unit, the concatenation logical unit number (Concatenation LU Number) which is defined for the logical units of one host, and the stored space (start and end logical block addresses Start LBA and End LAB) of each logical unit of the storage system.

[I/O Processing]

Figure 4:
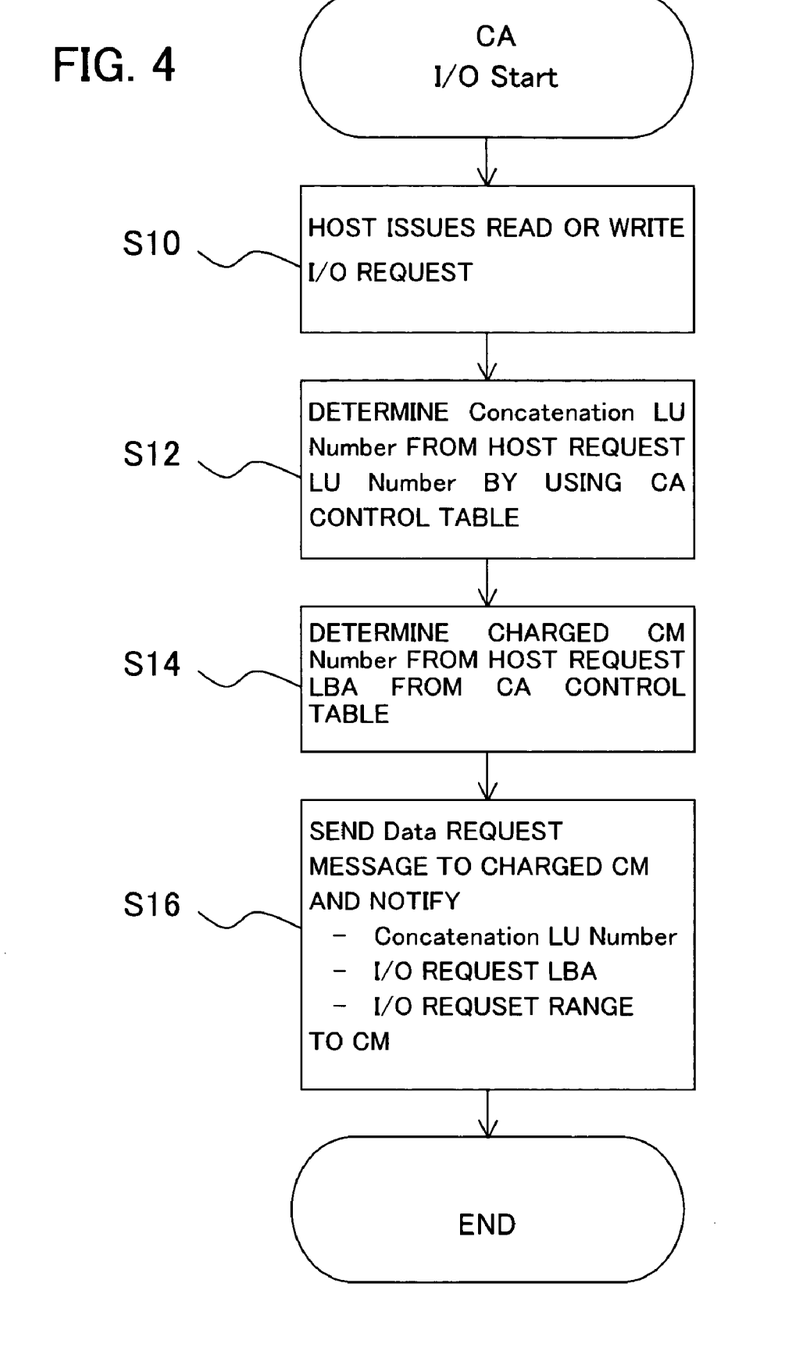
FIG. 4 is a flow chart depicting the host request acceptance processing of the CA according to an embodiment of the present invention.
Figure 5:
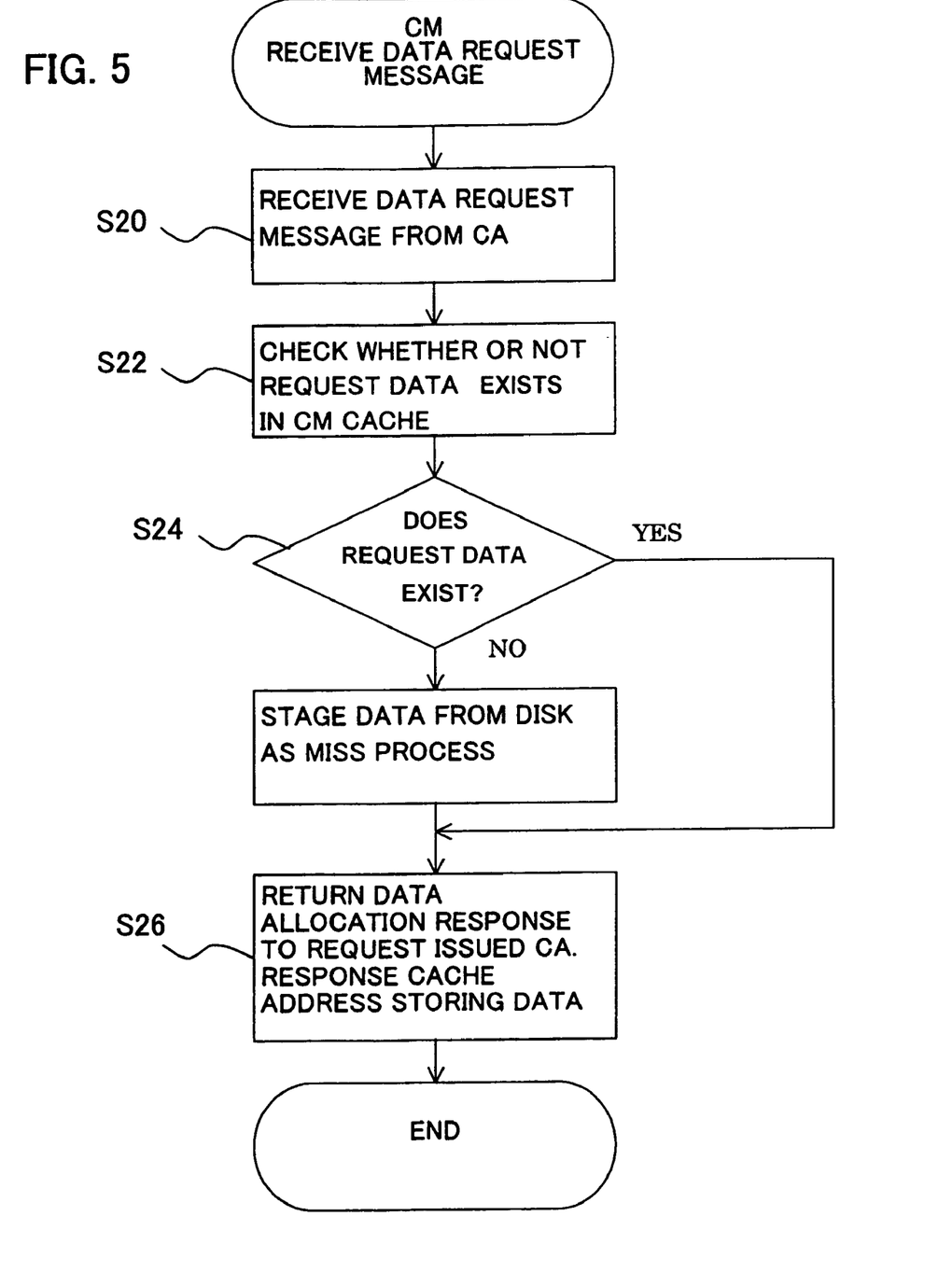
FIG. 5 is a flow chart depicting the data allocation processing of the CM according to an embodiment of the present invention.
Figure 6:
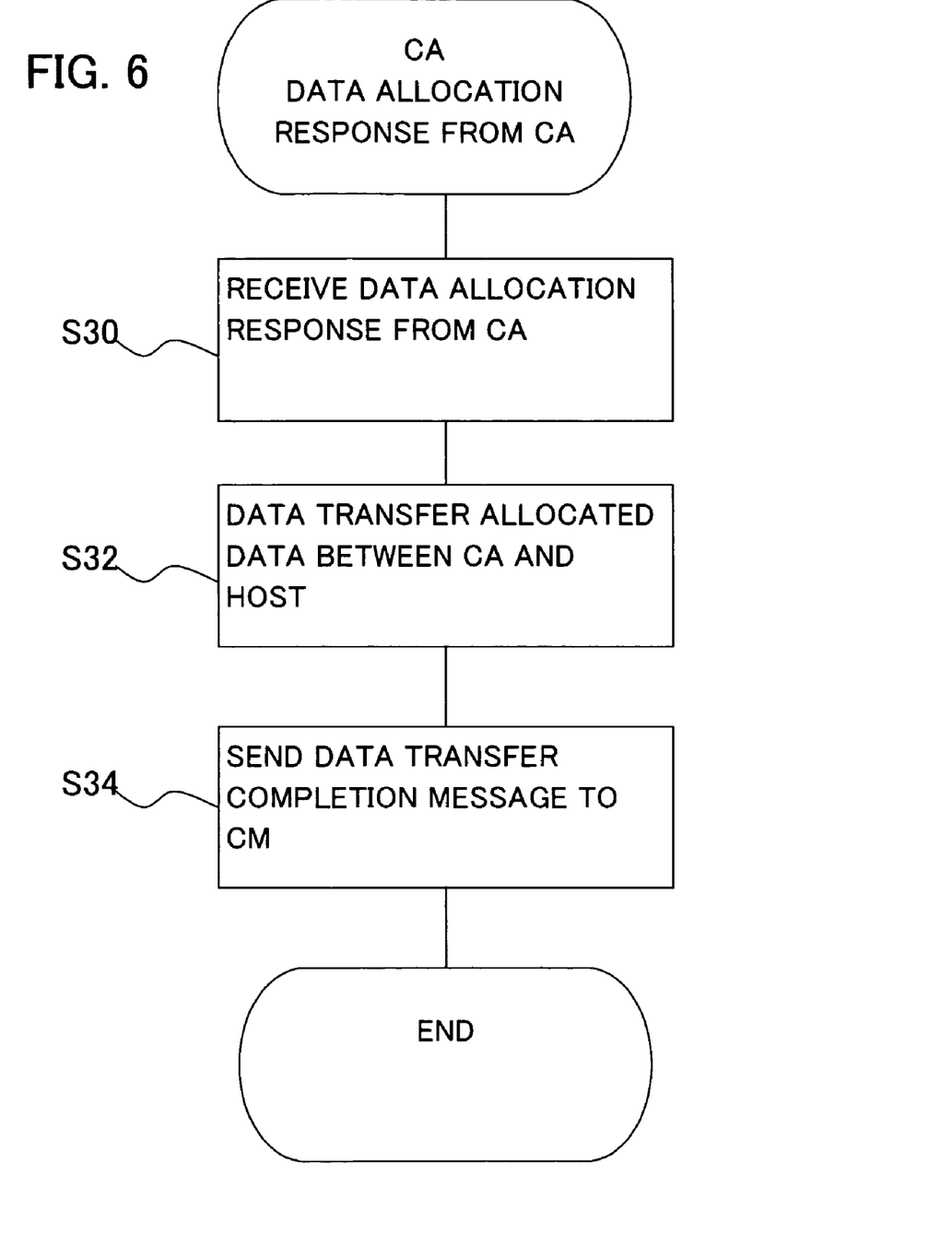
FIG. 6 is a flow chart depicting the data transfer processing of the CA according to an embodiment of the present invention.
Figure 8:
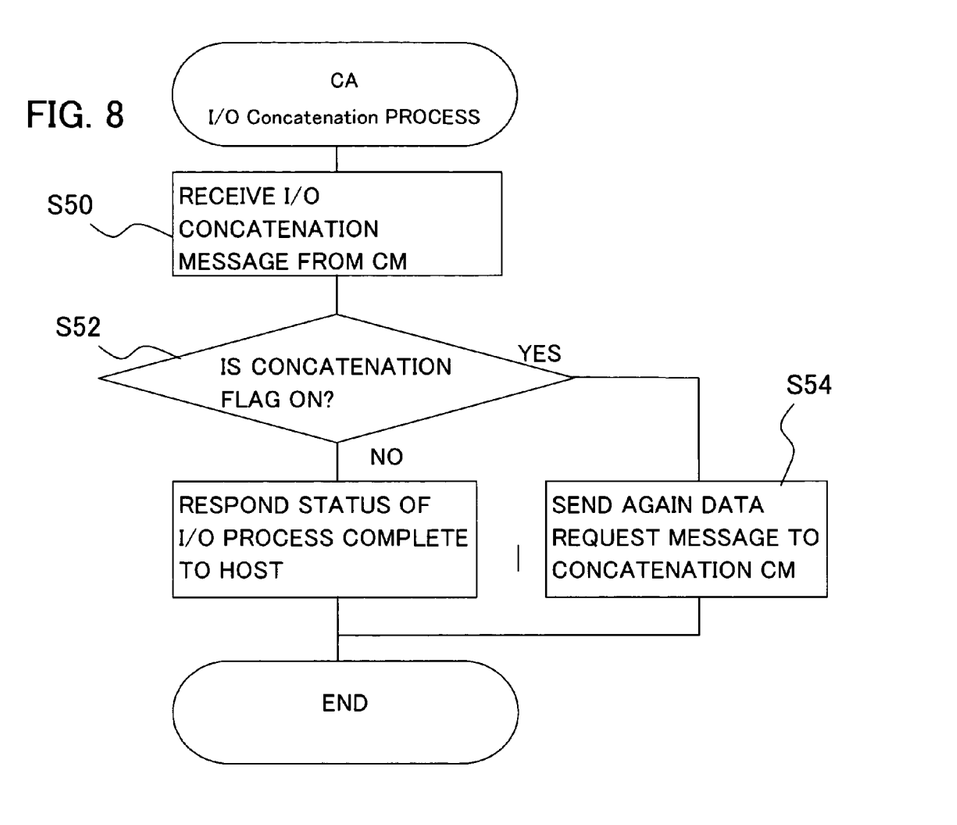
FIG. 8 is a flow chart depicting the I/O concatenation processing of the CA according to an embodiment of the present invention.
Figure 9:
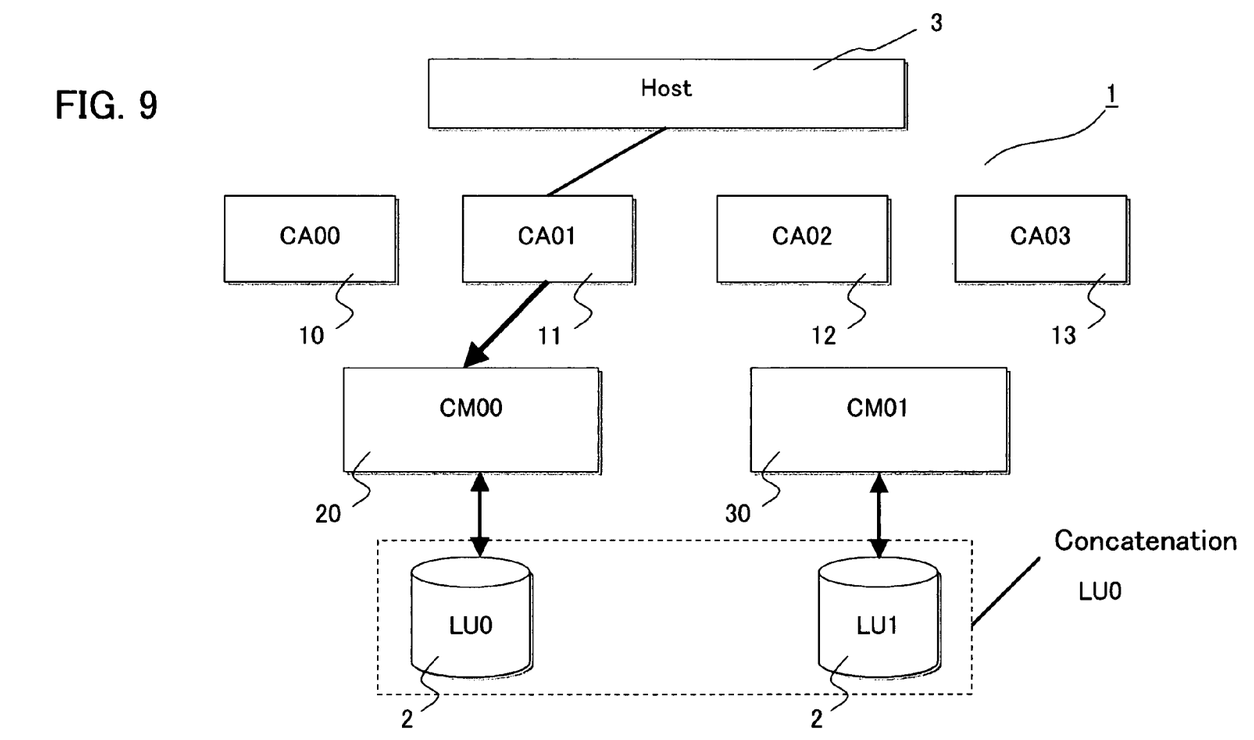
FIG. 9 is a diagram depicting a logical unit access operation of the concatenation logical unit of the system in FIG. 1.
Figure 10:
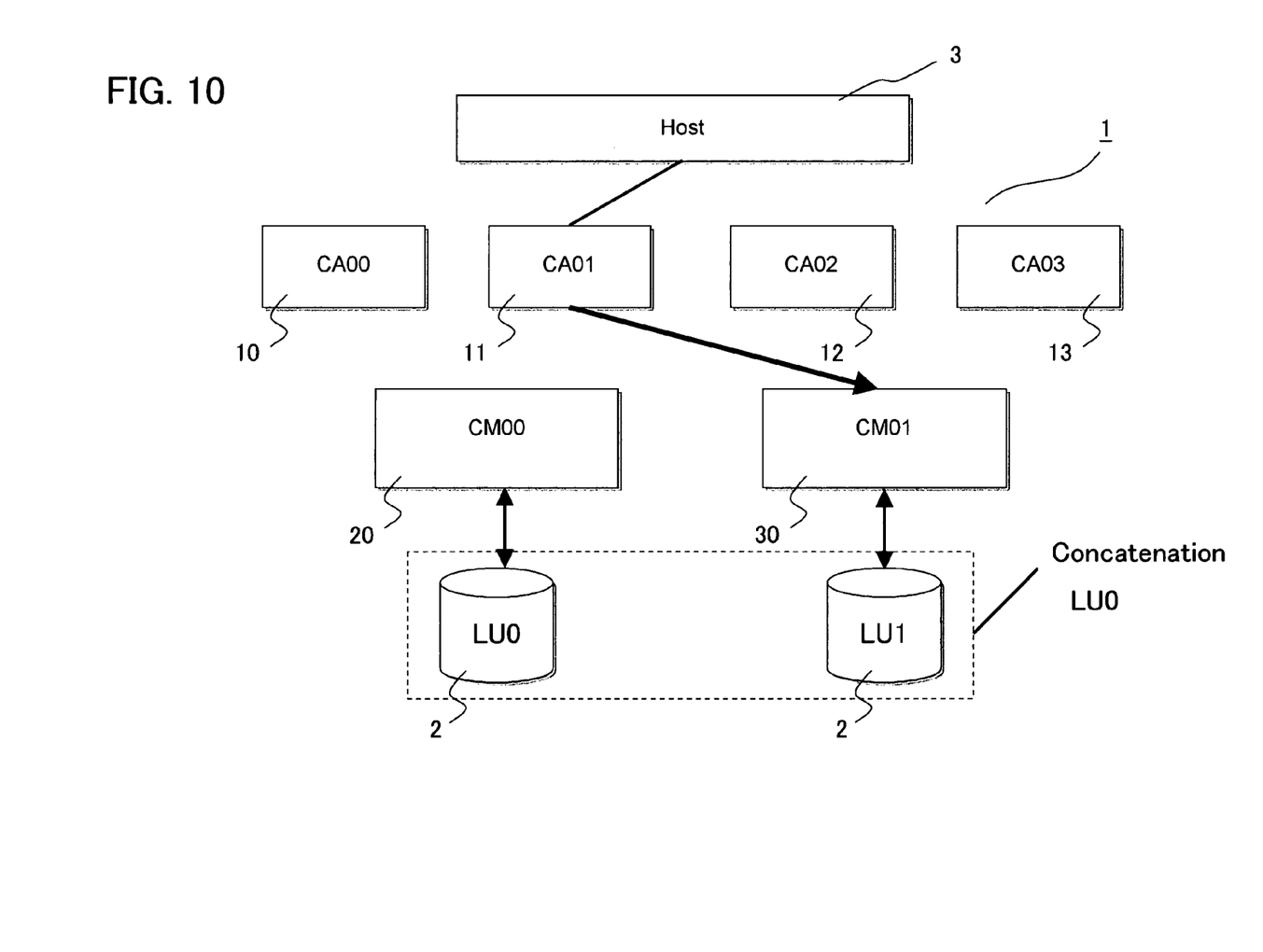
FIG. 10 is a diagram depicting another logical unit access operation of the concatenation logical unit of the system in FIG. 1.
Figure 11:
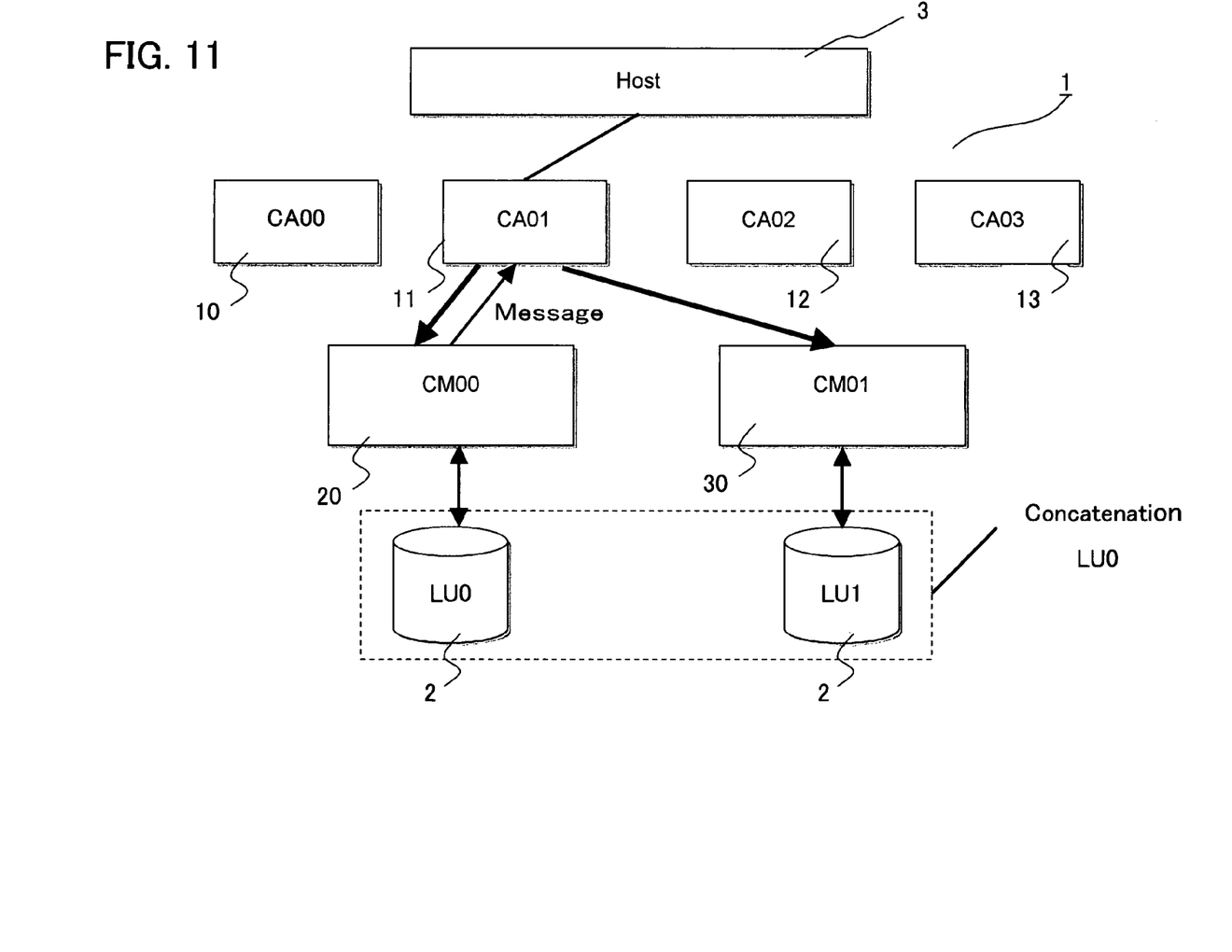
FIG. 11 is a diagram depicting a plurality of logical unit access operations extending over controllers of the concatenation logical unit of the system in FIG. 1.

Now the I/O processing of CA 10, . . . , 1n and the CM 20 (30) using the above mentioned control tables 50 and 26 (36) will be described. FIG. 4 is a flow chart depicting the host request acceptance processing of CA, FIG. 5 is a flow chart depicting the data allocation processing of CM, FIG. 6 is a flow chart depicting the data transfer processing of CA, and FIG. 8 is a flow chart depicting the I/O concatenation processing of CA. FIG. 9 to FIG. 11 are flow charts depicting the I/O processing thereof.

At first the host request acceptance processing of the CA will be described with reference to FIG. 4.

(S10) The CA 10 receives a read or write I/O request from the host 3.

(S12) The CPU 52 of the CA 10 determines the Concatenation LU Number from the host request LU Number using the CA control table 50 (FIG. 2).

(S14) The CPU 52 of the CA 10 determines the CM Number of the CM in-charge from the host request LBA using the CA control table 50 (FIG. 2).

(S16) The CA 10 sends the data request:message to the CM in-charge. This data request message includes the above mentioned Concatenation LU Number, I/O request LBA (start LBA), and I/O request range. And processing ends.

Now the data allocation processing of the CM will be described with reference to FIG. 5.

(S20) The CM 20 receives the data request message from the CA 10.

(S22) The CPU 22 of the CM 20 checks whether the host request data exists using the management information of the cache memory 24.

(S24) The CPU 22 of the CM 20 advances to step S26 if the requested data exists in the cache memory 24. If the requested data does not exist in the cache memory 24, on the other hand, the CPU 22 executes miss hit processing. In other words, the CPU 22 stages the data from the physical disk 2 constituting the target logical disk to the cache memory 24 via the DA 40.

(S26) When the requested data is allocated to the cache memory 24 in this way, the CM 20 returns the data allocation response to the requesting source CA 10. This data allocation response includes the data storage cache address. And processing ends.

Now the data transfer processing of the CA will be described with reference to FIG. 6.

(S30) The CA 10 receives the data allocation response from the CM 20.

(S32) The CPU 52 of the CA 10 DMA-controls the cache memory 24 of the CM 20 using the above mentioned data storage address, and transfers the allocated data to the host 3.

(S34) When the transfer of allocated data ends, the CPU 52 of the CA 10 sends the data transfer completion message to the CM 20. And processing ends.

Now the data transfer completion message processing of the CM will be described with reference to FIG. 7.

(S40) The CM 20 receives the data transfer completion message from the CA 10.

(S42) The CPU 22 of the CM 20 refers to the CM control table 26 (FIG. 3), and checks the I/O request LBA and I/O request range in the data request message received in step S30 in FIG. 5, and checks whether the I/O request extends over a plurality of CMs from the Concatenation LU Number.

(S44) If the I/O request does not extend over a plurality of CMs, the CPU 22 of the CM 20 sets the concatenation flag to "OFF". If it is judged that the I/O request extends over a plurality of CMs, on the other hand, the CPU 22 sets the concatenation flag to "ON". And the CPU 22 refers to the CM control table 26 (FIG. 3), and determines the concatenated CM model number in the concatenation LU.

(S46) After this check ends, the CM 20 sends the I/O concatenation message to the CA 10 which issued the request. This I/O concatenation message includes the above mentioned concatenation flag and the concatenated CM model number. And processing ends.

Now the I/O concatenation processing of the CA will be described with reference to FIG. 8.

(S50) The CA 10 receives the I/O concatenation message from the CM 20.

(S52) The CPU 52 of the CA 10 judges whether the concatenation flag in the I/O concatenation message is "ON". If this flag is not "ON", the CA 10 responds the I/O processing completion status to the host 3. And processing ends.

(S54) If the concatenation flag is ON, on the other hand, the CPU 52 sends the data request message again to the CM with the concatenated CM model number in the I/O concatenation message. And processing ends.

Figure 7:
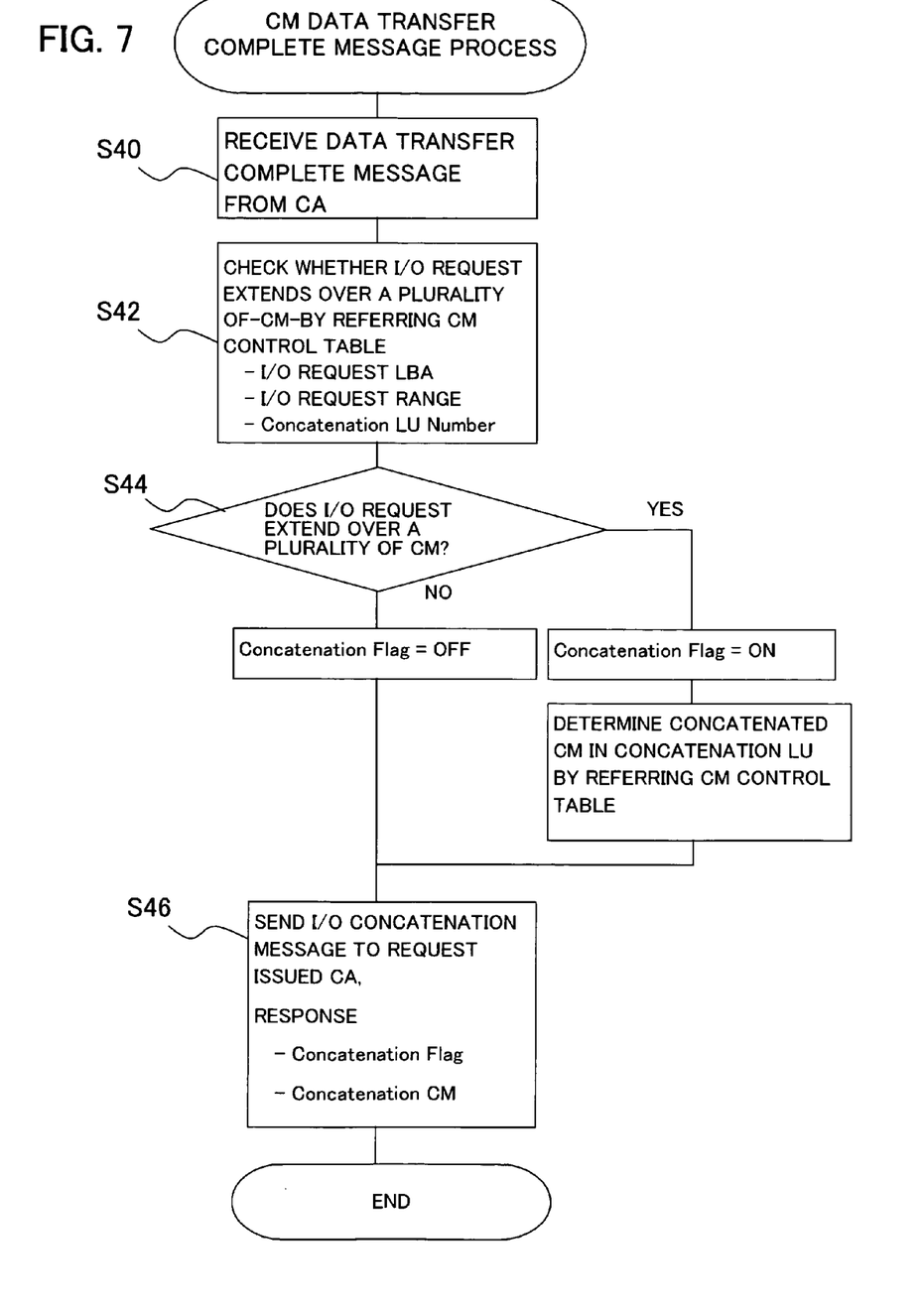
FIG. 7 is a flow chart depicting the data transfer completion message processing of the CM according to an embodiment of the present invention.

The CM which received this data request message executes the processing in FIG. 5, the CA 10 executes the processing in FIG. 6, then the CM executes the processing in FIG. 7, and the CA executes the processing in FIG. 8.

A concrete example of this I/O processing will be described with reference to FIG. 9 to FIG. 11. In FIG. 9 to FIG. 11, it is assumed that the concatenation LU0 is comprised of the logical units LU0 and LU1, which are concatenated.

As FIG. 9 shows, when the host 3 specifies I/O access to an LBA (Logical Block Address) range corresponding to the logical unit LU0 within the concatenation LU0, the CA 11 refers to the CA control table 50 and determines theological unit LU0 in-charge from the I/O start LBA, and determines the CM 20 in-charge from the determined LU0. The CA 11 sends the I/O data request to the CM 20.

Also as FIG. 10 shows, when the host 3 specifies I/O access to the LBA (Logical Block Address) range corresponding to the logical unit LU1 within the concatenation LU0, the CA 11 refers to the CA control table 50 and determines the logical unit LU1 in-charge from the I/O start LBA and determines the CM 30 in-charge from the determined LU1. The CA 11 sends the I/O data request to the CM 30.

Also as FIG. 11 shows, when the host 3 specifies I/O access to the LBA (Logical Block Address) range extending over the logical units LU0 and LU1 within the concatenation LU0, the CA 11 refers to the CA control table 50 and determines the logical unit LU0 in-charge from the I/O start LBA, and determines the CM 20 in-charge from the determined LU0. The CA 11 sends the I/O data request to the CM 20.

Then after I/O processing ends, the CM 20 refers to the CM control table 26, and recognizes that the processing must be continued to another LU, and notifies this message to the CA 11. This message includes the information on which CM continues the processing (CM 30 in this case). Then CA 11 sends the I/O data request to the CM 30 by this notified message.

In this way, LUS extending over a plurality of CMs can be concatenated by data request processing to the plurality of CMs, so the load of the I/O processing of the concatenation LU of the CM can be distributed, as shown in FIG. 9 and FIG. 11. In other words, the logical units can be concatenated without increasing the performance of the controller of the CM and the size of the cache memory.

Also the flexibility in selecting logical units to be concatenated increases, a flexible large capacity LU can be constructed, and user convenience can be improved.

The present embodiment can be implemented merely by adding a control table and data transfer completion message processing of the CM, and can be easily implemented without dropping performance very much. The present embodiment can also be implemented by such a simple method as a message.

[Other Embodiments]

In the above embodiment, the I/O request was described using the case of a read access, but write access can also be executed in similar processing. The above embodiment was described using a RAID with the redundant configuration shown in FIG. 1, but can also be applied to a storage system with another redundant configuration. Also for the physical disk, various storage devices, including a magnetic disk, optical disk and magneto-optical disk, can be applied.

One concatenation LU was used for the description, but the present invention can be applied to a plurality of concatenation LUs, as shown in the control tables in FIG. 2 and FIG. 3. In the same way, concatenation is judged by the CM in the above description, but concatenation may be judged by the CA.

The present invention was described using embodiments, but the present invention can be modified in various ways within the scope of the essential character of the present invention, which shall not be excluded from the scope of the present invention.

In this way, according to the present invention, LUs extending over a plurality of CMs can be concatenated by the data request processing to the plurality of CMs, so the load of the I/O processing of the concatenation LU of the CM can be distributed. In other words, logical units can be concatenated without increasing the performance of the controller of the CM and the size of the cache memory.

Also flexibility in selecting logical units to be concatenated increases, a flexible large capacity LU can be constructed, and user convenience can be improved. Also the performance of the controller itself can be improved.

What is claimed is:

1. A storage control apparatus for accessing data stored in a concatenation unit having a plurality of logical units, each logical unit being comprised of one or more physical units, by a request from a host, comprising:
   a channel adapter for interfacing with said host; and
   a plurality of controllers which control each one of the plurality of logical units,
   wherein when said channel adapter receives said request from said host, said channel adapter sends an I/O data request for one logical unit of said plurality of logical units to a first controller which causes said one logical unit to execute I/O processing in said first controller, and then said channel adapter sends another I/O data request for another logical unit of said plurality of logical units to a second controller which causes said another logical unit to execute I/O processing in said second controller, and
   wherein said first controller judges whether said I/O data request is an I/O request extending over to said second controller which is in charge of said another logical unit after said I/O processing in said first controller, and sends a message indicative of the judgment result to said channel adapter.

2. The storage control apparatus according to claim 1, wherein each controller has a table for storing the logical block address range of each logical unit, and
   said first controller refers to said table in the logical block address range requested by said I/O data request, and judges whether said I/O data request is an I/O data request extending over to said second controller, which is in charge of said another logical unit.

3. The storage control apparatus according to claim 1, wherein said channel adapter sends said I/O data request to said second controller according to the response from said first controller that the I/O data request extends to said second controller.

4. The storage control apparatus according to claim 1, wherein said each controller comprises:
   a cache memory for storing a part of the data of said logical unit which the controller is in charge of; and
   a processing unit for executing I/O processing using said cache memory according to said I/O data request.

5. The storage control apparatus according to claim 1, wherein said channel adapter is constituted by a plurality of channel adapters for connecting said plurality of controllers.

6. A storage control apparatus for accessing data stored in a concatenation unit having a plurality of logical units, each logical unit being comprised of one or more physical units, by a request from a host, comprising:
a channel adapter for interfacing with said host; and
a plurality of controllers which control each one of the plurality of logical units,
wherein when said channel adapter receives said request from said host, said channel adapter sends an I/O data request for one logical unit of said plurality of logical units to a first controller which causes said one logical unit to execute I/O processing in said first controller, and then said channel adapter sends another I/O data request for another logical unit of said plurality of logical units to a second controller which causes said another logical unit to execute I/O processing in said second controller,
wherein said channel adapter has a table for storing said controllers corresponding to each logical unit, the logical block address range of each logical unit, and the logical units constituting said concatenation unit, and
said channel adapter selects a controller of said corresponding logical unit when said request is received from said host.

7. The storage control apparatus according to claim 6, wherein each controller has a table for storing the logical block address range of each logical unit, and
said first controller refers to said table in the logical block address range requested by said I/O data request, and judges whether said I/O data request is an I/O data request extending over to said second controller, which is in charge of said another logical unit.

8. A storage control method for accessing data stored in a concatenation unit, each logical unit being comprised of one or more physical units, by a request from a host, comprising steps of:
receiving said request from said host to a channel adapter;
sending an I/O data request for one logical unit of said plurality of logical units from said channel adapter to a first controller which is in charge of said one logical unit out of a plurality of controllers which are in charge of said plurality of logical units;
executing I/O processing in said first controller;
judging whether said I/O data request is an I/O data request extending over to said second controller which is in charge of said another logical unit after said I/O processing by said first controller;
sending a message indicative of the judgment result to said channel adapter,
sending another I/O data request for another logical unit of said plurality of logical units from said channel adapter to a second controller which is in charge of said another logical unit of said plurality of controllers which are in charge of said plurality of logical units; and
executing I/O processing in said second controller.

9. The storage control method according to claim 8, wherein said response step comprises:
a step of referring to a table storing the logical block address range of each logical unit in the logical block address range requested by said I/O data request by said first controller; and
a step of judging whether said I/O data request is an I/O data request extending over to said second controller, which is in charge of said another logical unit.

10. The storage control method according to claim 8, wherein the step of executing I/O processing in said second controller further comprises a step of sending said I/O data request to said second controller according to the response from said first controller that the I/O data request extends to said second controller by said channel adapter.

11. The storage control method according to claim 8, wherein the I/O processing step for said I/O data request further comprises a step of executing I/O processing using a cache memory for storing a part of the data of said logical unit which each controller controls according to said I/O data request.

12. The storage control method according to claim 8, wherein said channel adapter is constituted by a plurality of channel adapters for connecting said plurality of controllers, and said reception step further comprises a step of which one of the plurality of channel adapters for connecting said plurality of controllers receives the request from said host.

13. A storage control method for accessing data stored in a concatenation unit, each logical unit being comprised of one or more physical units, by a request from a host, comprising steps of:
receiving said request from said host to a channel adapter;
sending an I/O data request for one logical unit of said plurality of logical units from said channel adapter to a first controller which is in charge of said one logical unit out of a plurality of controllers which are in charge of said plurality of logical units;
executing I/O processing in said first controller;
sending another I/O data request for another logical unit of said plurality of logical units from said channel adapter to a second controller which is in charge of said another logical unit of said plurality of controllers which are in charge of said plurality of logical units; and
executing I/O processing in said second controller,
wherein said reception step comprises:
a step of referring to a table for storing said controllers corresponding to each logical unit, logical block address range of each logical unit, and logical units constituting said concatenation unit by said channel adapter; and
a step of selecting a controller of said corresponding logical unit when said request is received from said host.

14. The storage control method according to claim 13, wherein said response step comprises:
a step of referring to a table storing the logical block address range of each logical unit in the logical block address range requested by said I/O data request by said first controller; and
a step of judging whether said I/O data request is an I/O data request extending over to said second controller, which is in charge of another logical unit.

* * * * *